Jan. 2, 1940.　　　　　A. G. DEAN　　　　　2,185,977
VEHICLE BODY CONSTRUCTION AND METHOD OF ASSEMBLING THE SAME
Filed Aug. 20, 1934　　　3 Sheets-Sheet 1
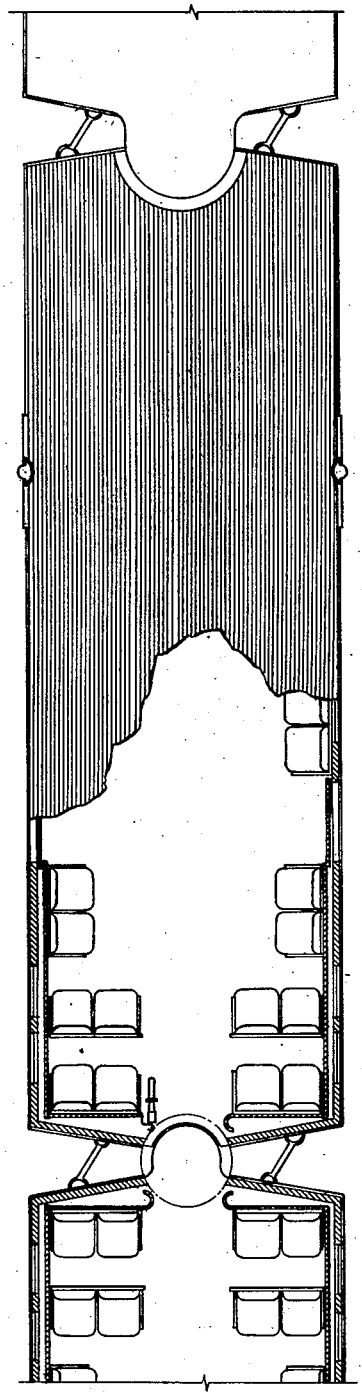
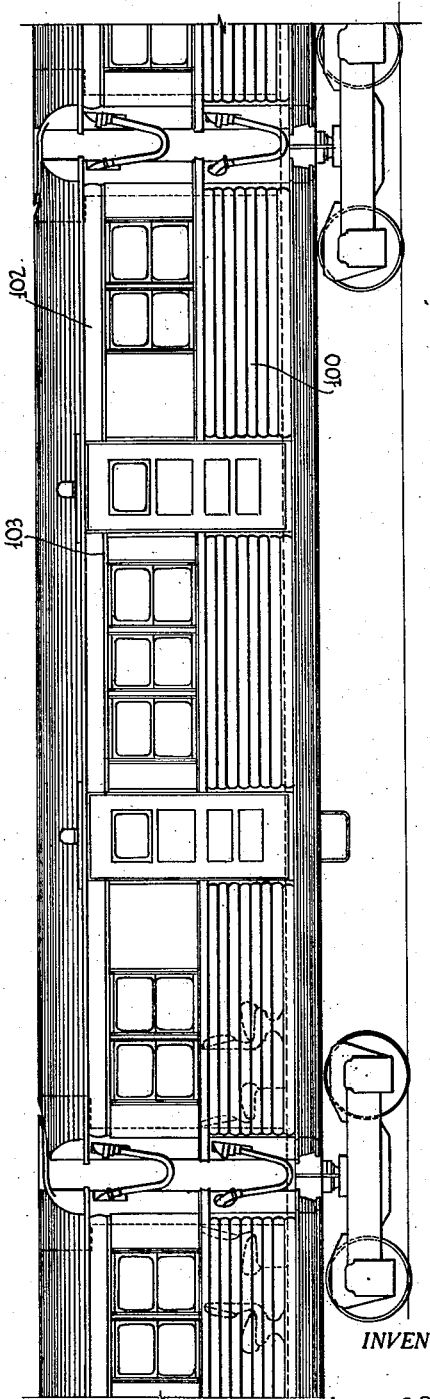
INVENTOR.
ALBERT G. DEAN.
BY
John P. Fairbox
ATTORNEY.

Jan. 2, 1940. A. G. DEAN 2,185,977
VEHICLE BODY CONSTRUCTION AND METHOD OF ASSEMBLING THE SAME
Filed Aug. 20, 1934 3 Sheets-Sheet 2
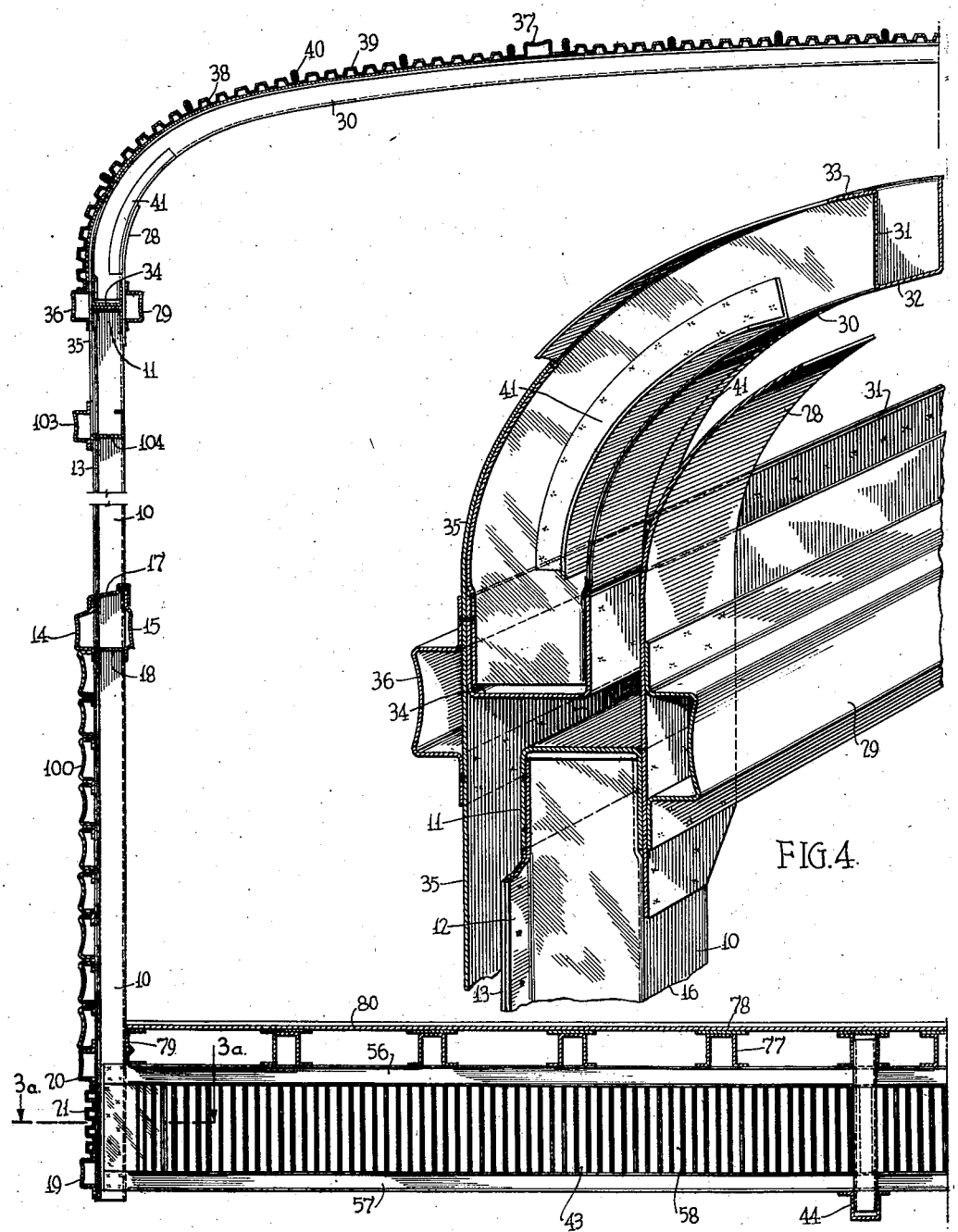
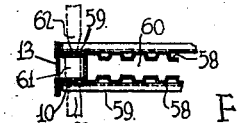
INVENTOR
ALBERT G. DEAN.
BY John P. Fairbox
ATTORNEY.

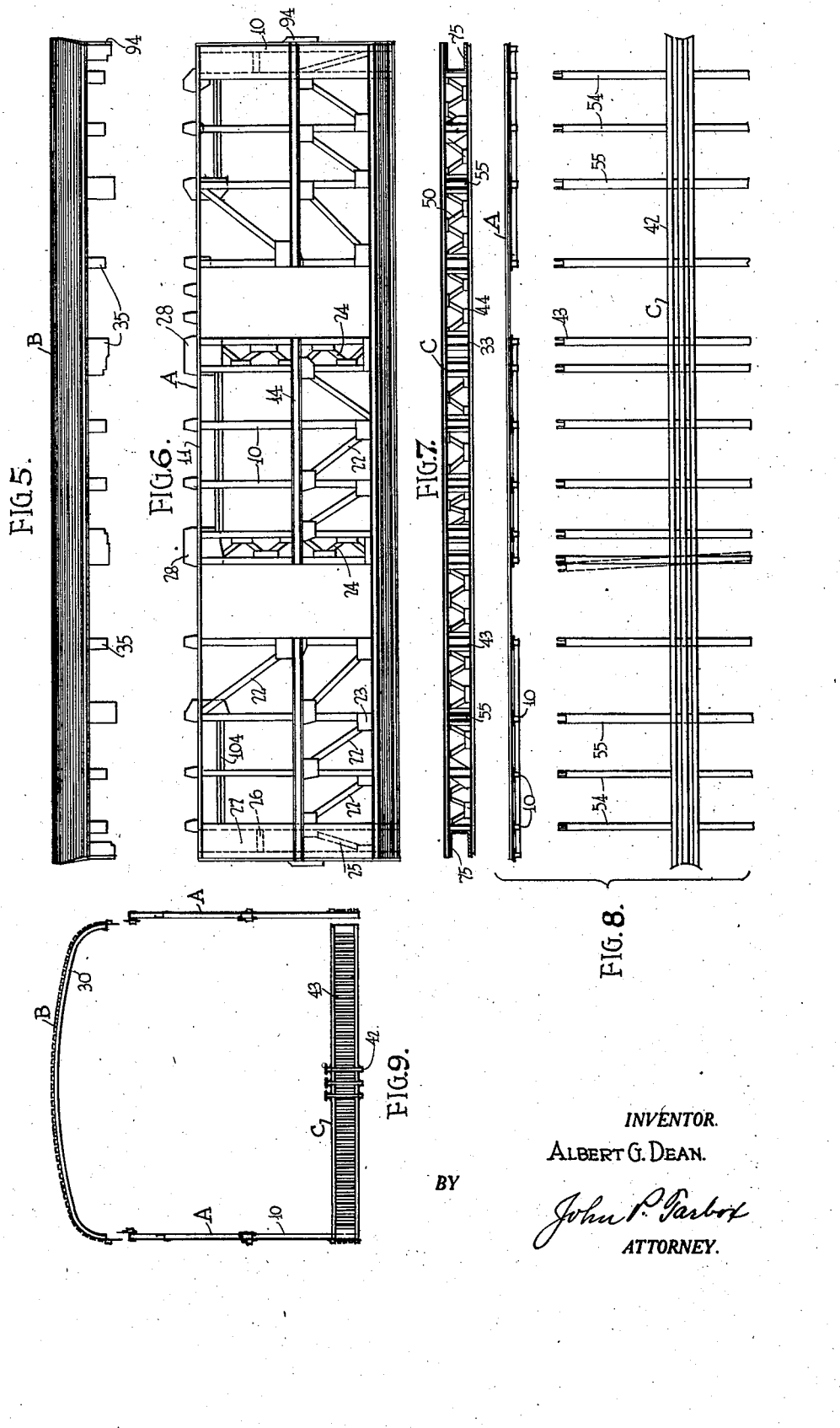

Patented Jan. 2, 1940

2,185,977

UNITED STATES PATENT OFFICE 2,185,977

VEHICLE BODY CONSTRUCTION AND METHOD OF ASSEMBLING THE SAME

Albert G. Dean, Narberth, Pa., assignor to Edward G. Budd Manufacturing Company, Philadelphia, Pa., a corporation of Pennsylvania Application August 20, 1934, Serial No. 740,544

26 Claims. (Cl. 105—397)

The invention relates to vehicle bodies and particularly to such bodies adapted for use in articulated trains in which the adjacent ends of two cars are supported from a common truck.

While the vehicle body is designed primarily with a view to its use in this type of articulated train, it will be understood that a number of the features thereof are equally applicable to other types of vehicle bodies such as motor buses or other vehicles in which light weight construction is desirable.

It is an object of the invention to provide a body of this class having a high strength-weight ratio.

A further object is the simplification of the structure and the arrangement of the parts throughout in such fashion that they are readily accessible for joinder to each other and for the attachment of accessories and the like.

A further object is the organization of parts entering into the body structure in such manner as to develop the full strength of the materials entering into the structure and the utilization of the various members entering into the structure wherever possible to serve a number of different functions. This object is ancillary to the general object of simplification of the structure.

A further object is an arrangement whereby the loading due to the eccentric end bearings and buffer shocks are effectively distributed through the wall structure in regions especially adapted to take those stresses of the car, thereby to a large extent avoiding concentration of stresses in regions not so adapted.

A further object of the invention is the design of the parts so that they can be readily assembled in various sub-assemblies, the sub-assemblies, including marginal conformations which facilitate their joinder together in the final assembly.

The manner in which these objects are attained is by a construction and arrangement of the parts of the body which permits the use throughout of relatively light gauge materials. A material eminently satisfactory in such construction is light gauge stainless steel of high tensile strength, the tensile strength being of the order of 150,000 pounds per sq. in. and containing in the neighborhood of 18% chrome and 8% nickel. Such steel can be readily drawn or rolled from flat strip stock into the desired angular or channel sections into such form that the parts can be readily assembled by spot welding in the margins to form hollow or box section beams, or trusses whose members are of hollow section and joined together in a manner to avoid eccentric loading on the trusses.

It will be understood, however, that a great many of these objects can be attained with other materials having a high strength-weight ratio and which are adapted to be readily formed into hollow sections from flat stock and readily joined by spot welding or riveting.

Ease of assembly is obtained by fabricating the side wall sections, the roof section and the underframe section as separate sub-assembled truss structures and by the special forming of the margins in which these sub-assembly units are joined. The special forming of the margins permits readily bringing the sub-assemblies together in the final assembly and joining them preferably by simple spot welding operations.

The general distribution of the longitudinally directed buffer shocks and the eccentric loading due to the placement of the bearings beyond the end wall of the car, is attained by the provision of a vertically deep center sill construction which ties into vertically deep floor beams transmitting shocks taken by the center sill through its connection at its ends with the end sill carrying the eccentric bearings directly into the underframe structure and through it into the side wall trusses and indirectly through the end wall trusses into the front ends of the side wall trusses.

Ease of fabrication is further attained by the manner in which the various assembly steps are carried out. Among the features contributing to this are the manner of assembling the floor beams to the center sill structure and the manner of assembling the floor beams to the posts of the side wall structure and the manner of attachment of the end sill to the center sill.

These and other objects and the manner in which they are attained will become apparent from the following detailed description when read in connection with the accompanying drawings forming a part thereof.

In the drawings,

Figure 1 is a side elevational view of the section of an articulated train, to the construction of which the invention has been shown to be applied.

Figure 2 is a plan view of the train section shown in Figure 1, with parts of the roof broken away to show the interior seating arrangement which may be employed when constructed according to the invention.

Figure 3 is a typical transverse sectional view showing one half of the car body.

Figure 3a is a horizontal sectional view showing the joint between the posts and the floor beams taken substantially on lines 3a—3a of Figure 3.

Figure 4 is a detail perspective view on an enlarged scale showing the final assembly joint marginal conformation of the side and roof sub-assemblies, the parts being shown in section.

Figure 5 is a side elevational view of the roof sub-assembly.

Figure 6 is a side elevational view of the side wall sub-assembly.

Figure 7 is a corresponding view of the underframe sub-assembly.

Figure 8 is a diagrammatic view showing the relative positions of the side and underframe sub-assemblies, as they are brought together for final assembly.

Figure 9 is a more or less diagrammatic view indicating the process of assembly, one of the side sill assemblies being shown assembled to the underframe, the other side sub-assembly being shown in position to be brought in assembled relation with the opposite side of the underframe and the roof sub-assembly being indicated in position where it can be dropped down upon the side assemblies to complete the assembly of the four main sub-assembly units.

In accordance with the invention the improved vehicle body is preliminarily sub-assembled into two side frame sub-assemblies designated generally by the letter A, one of which is shown in side elevation in Fig. 6, a roof sub-assembly designated by the letter B shown in a similar view in Fig. 5, and an underframe sub-assembly designated by the letter C shown in Figs. 7 and 8 more or less diagrammatically, respectively, in side elevation and in plan. Each of these sub-assemblies can be pre-assembled on a special assembly jig, where the parts entering into these structures are readily accessible for attachment to each other. This method of assembly into sub-assemblies is particularly desirable in speeding up production where large numbers of cars are being produced.

The foundation structure of the side sub-assemblies are the spaced vertical posts 10 which are of generally outwardly presenting channel form having their side walls flanged in their edges, as appears clearly in Figs. 3, 3a and 4. These are first organized into shear panels and are connected at the top by a channel member 11 which is telescoped over the upper ends of the posts and secured thereto through its outer and inner walls. As is clearly shown in Fig. 4, the inner side wall of each post is offset at the top so that the inner side wall of the channel 11 has its outer surface flush with the inner face of the posts. By reason of the open section of the posts and channel, access is readily had to secure the posts to the channel by spot welding the inner wall of a post to the inner side wall of the channel and the lateral extending flange 12 of the post to the outer side wall of the channel.

In the construction shown, the posts are spaced longitudinally at varying distances to take care of various openings required in the side of the car and properly take the load stresses in the various longitudinal regions of the body. The organization of the posts and the panels according to the present construction, see Figs. 1 and 6, comprises a narrow deadlight panel at each end of the unit of the sub-assembly, two window panels inwardly of said deadlight panel at each end of the car, a wide deadlight panel inwardly of said window panels, a door panel inwardly of said deadlight panel, two narrow deadlight panels inwardly of the door panels and three window panels between said narrow deadlight panels. The door openings extend substantially the height of the side sub-assembly.

At the belt line, the posts 10, which have first been reinforced by cover plates 13, to form a box section structure, these cover plates being spot welded to the lateral extending flanges 12 of the posts, are further interconnected by flanged channel section molding strips 14 and 15, see Figs. 3 and 6, extending along the belt line and spot welded through their laterally extending flanges, respectively, to the flanges 12, 13 and the inner wall 16 of the posts. These molding strips extend throughout the length of the side unit sub-assembly, except for the interruption at the door openings. They are connected to form a box section structure at the bottom of the window openings by downwardly facing channel section window sills 17, the top wall of which slopes outwardly and the outer and inner side walls of which overlap the lateral flanges of the molding strips 14 and 15 and are welded thereto. Between the posts similarly downwardly facing channels 18 telescoped between the lower flanges of the molding strips 14 and 15 and secured thereto close the bottom of the section.

In their lower portions the posts are interconnected by continuous longitudinal molding strips 19 and 20 similar to the molding strip 14 and similarly connected to the posts. These last-named molding strips are spaced a slight distance and the space between them is bridged by a continuous longitudinal strip of corrugated paneling 21.

To complete the truss structure of the side wall frames, the diagonal members 22 of box section and adapted to take both compression and tension strains are secured in place. These diagonal members extend from a point adjacent the bottom of one post to join the adjacent post at the belt line and are secured to the posts through the intermediary of generous gussets 23 spot welded to the posts and diagonal members, similar securement being provided both inside and outside of the side wall truss structure, thus avoiding eccentricity of loading in the truss structure. Similar diagonals also connect the posts defining the wide deadlight panels above the belt line. The posts defining the narrow deadlight panels flanking the inner sides of the doorway openings are interconnected by numerous short diagonals 24 connected to the posts by gussets in the manner described and forming with the posts which they connect, trussing of the Warren type flanking the doorway openings. The posts defining the narrow end deadlight columns are also interbraced by the diagonal 25 in their lower regions and by a horizontal member 26 in their upper regions. These narrow panels, as well as the narrow panels flanking the inner sides of the doorway openings and also the upper portions of the wide deadlight panels outwardly of the doorway openings, are covered either prior to or subsequent to the final assembly by flat deadlight panels 27.

The side sub-assemblies are further provided with final assembly joint structures in the form of generous gussets 28 secured to the inner walls of the posts 10 and the channel 11 connecting the posts by spot welding thereto, these gussets extending between two adjacent posts in the case of the closely spaced posts arranged on the inner side of the doorway openings and serving also to connect the top diagonal members 22 and 24 to the tops of the posts.

These gussets extend a substantial distance above the tops of the posts and the channel interconnecting them to form final assembly joints with the roof structure. To provide further final assembly joint structures and to reinforce the final assembly joint to provide a strong hollow section beam structure extending the length of the car body above the doorway and window openings, an inner molding strip 29 of outwardly facing channel section flanged in its edges is applied to the tops of the posts and the lower flange thereof is connected to the posts in the region of overlap between the gussets, the posts and the inner side wall of the channel 11, the upper flange of said member extending above the tops of the posts and the channel and forming with the gussets a final assembly joint structure for attachment to the roof sub-assembly.

The roof sub-assembly structure B as shown in Figures 3, 5 and 9, is like the side sub-assemblies, constructed on a separate sub-assembly jig where the parts are readily accessible for joinder and comprises as its foundation structure the spaced carlines 30 spaced in correspondence with the spacing of the side post carlines. If desired, however, additional roof carlines can be inserted between the post carlines. These carlines conform with the general contour of the roof being relatively flat in their central portions and curved in their side portions to form the side quarters of the roof and terminating in substantially vertical end portions which are in the final assembly in alignment with the side walls.

As clearly shown in Figs. 3 and 4, these carlines are of flanged channel section similar to the post carlines 10 and are joined in their lateral margins by longitudinally extending channels as 34 extending the full length of the sub-assembly which are, like the channels 11 connecting the tops of the post carlines, telescoped over the ends of the roof carlines 30 and secured respectively to their inner and outer walls 32 and 33. Due to the openness of the joint, this joinder is readily effected by spot welding.

The bottoms of the channels 34 are, in the final assembly, brought into overlapping relation with the bottoms of the channels 11 connecting the tops of the posts and secured together in their overlapped areas in the regions between the carlines.

Additional final assembly joint structures are provided at the lateral margins of the roof sub-assembly by means of the gussets as 35 which overlap the outer sides of the ends of the roof carlines and the outer side of the channels 34 and are secured thereto by spot welding. These gussets, like the gussets 28 on the side wall sub-assemblies, are extended beyond the ends of the carlines and the channel 34, in this case in a downward direction, these extensions being adapted to overlap the side sub-assembly structures in the final assembly and form final assembly joints therewith.

The joint between the roof sub-assembly and the side sub-assembly is further reinforced by an outer moulding strip 36 extending the length of the sub-assembly. This moulding strip is of an inwardly facing flanged channel section and is secured to the roof sub-assembly through its upper flange which overlaps the ends of the carlines 30, the connecting channel 34, and the gussets 35, and is spot welded thereto. The lower flanges of this flanged channel extends down below the ends of the carlines and the bottom of the channel connecting them and may be welded in the sub-assembly to the gussets 35 and in the final assembly to the parts of the side sub-assemblies as will be described hereinafter.

To constitute the side portions of the roof sub-assembly a load carrying beam structure bridging the doorway openings, the carlines 30 are tied together some distance inwardly of their curved side portions by longitudinally extending hollow section members, as 37, which may be of flanged channel section similar to the moulding strip 36 but including additionally upwardly extending flanges from the ends of the laterally extending flanges thereof. The longitudinal members 37 thus form the upper chords of the beam structure while the longitudinally extending members connected together to form the final sub-assembly joint between the side of the roof sub-assembly and the side sub-assembly form the lower chord. To provide a continuous webbing between these chords, a flat plate 38 extending continuously in the direction of the length of the roof sub-assembly over the doorway openings and some distance beyond said openings and laterally bridging the space between the chords, is laid upon the carlines and secured thereto. Finally, to complete the roof structure and to give additional strength and rigidity thereto, the paneling 39 is laid over the whole width of the roof structure except at the locations of the members 37. This paneling preferably is formed of narrow corrugated strips extending substantially the length of the roof sub-assembly having edge flanges which project upwardly, the flanges of two adjacent panels being spot welded together and covered by a cap strip 40 telescoped thereover and spot welded thereto, and the flanges of the strips adjacent the members 37 being similarly secured to the upwardly extending flanges of said members.

In the final assembly, after both side sub-assemblies have been brought in place and secured to the bottom sub-assembly C, in a manner indicated at the left side of Fig. 9, the roof sub-assembly is brought down from the position indicated in Fig. 9 so that its lateral edge channels 34 rest on top of the edge channels 11 of the side sub-assemblies. In this position the gussets 28 on a side sub-assembly overlap the inner wall 32 of the adjacent ends of the roof carlines, and the upper flange of the flanged channel overlaps the inner side wall of the channel 34, while the gussets 35 on the adjacent edge of the roof sub-assembly overlap the laterally extending flanges 12, 13 on the outer side of the post carlines, and the lower flange of the channel 36 overlaps the outer side wall of the channel 11 as clearly appears from Fig. 3. By the spot welding of these overlapped parts in their overlapped areas, a very strong and sturdy final assembly joinder is effected. The openness of the joints due to the structures utilized in making the joints renders these joints relatively simple. If desired, the roof carlines may be reinforced as indicated in Figs. 3 and 4 by curved angles 41 each of which has one arm connected to the side wall of a carline and the other arm projecting laterally in the plane of the inner or bottom wall 32. It will be seen that the gussets 28 will overlap this laterally projecting arm and may be additionally secured thereto.

Spacing and reinforcing flat strips, as 31, of the thickness of the gussets 28 and 35 may be inserted between the flanges of the channels 29 and 36 and the side walls of the connecting channels 11 and 34, three thicknesses of metal being spot welded together.

The side paneling 100 of the side sub-assemblies may be applied at any stage during assembly but is preferably applied after the side frame sub-assembly and the roof and underframe sub-assemblies have been brought together in the final assembly. This side paneling may comprise, as shown, longitudinal fluted panel strips having inwardly extending flanges and joined to the side posts through angle bracket 101 welded to the side posts and to the flanges of the channel section panel strips. Similarly the finish paneling for the deadlight panels and for the letter board panels 102 and the flanged channel moulding strips 103 and top sills 104 at the tops of the window openings may all be applied after the frame parts have been assembled into the final assembly.

While in the preceding detail description the construction has been applied to a specific type of vehicle body, it will be understood that a number of the features of this construction are equally applicable to other types of vehicle bodies, and it is not intended to limit the invention to use in the particular field and to the particular disclosure. Changes and modifications will also become apparent to those skilled in the art and such changes and modifications as will be apparent upon the reading of this disclosure to those working in this art are comprehended as falling within the scope of the appended claims.

What I claim is:

1. A side sub-assembly for vehicle bodies comprising a truss structure including spaced posts interconnected at the top by a continuous channel member telescoped over the upper ends of the posts and secured thereto through its opposite side walls, gussets overlapping one side of said posts and the adjacent portions of the channel and secured thereto, a continuous flanged channel molding strip having one of its flanged side walls laterally overlap the tops of the posts, the adjacent side wall of the channel and the gussets and having the other of its flanged side walls extended above the tops of the posts and the channel, said gussets being also extended above the posts and channel, whereby the bottom wall of the channel, the gussets and the flanged upper side wall of the molding strip are adapted to form final assembly joint structures for attaching the side wall sub-assembly to a roof sub-assembly.

2. A roof sub-assembly for vehicle bodies comprising a truss structure having curved side portions terminating in a substantially vertical edge portion, spaced carlines extending throughout the width of the sub-assembly, continuous hollow section longitudinal members joining the ends of the carlines and continuous hollow section longitudinal members joining the carlines a short distance inwardly of said curved side portions and longitudinally continuous sheathing laid over and secured to said carlines and interconnecting said hollow section longitudinal members and constituting with said longitudinal members and carlines a trussed beam.

3. A roof sub-assembly for vehicle bodies comprising a truss structure having curved side portions and a relatively flat central portion, spaced carlines extending throughout the width of the sub-assembly, continuous hollow section longitudinal members joining the ends of the carlines and continuous hollow section longitudinal members joining the carlines a short distance inwardly of said curved side portions, a longitudinally continuous flat sheet laid over and secured to said carlines in the region between said edge members and said inwardly spaced members and continuous longitudinally corrugated sheathing laid over the entire width of the roof structure and secured to the carlines and said flat sheets.

4. A roof structure for vehicle bodies comprising a truss structure including spaced carlines connected together in their ends by a continuous longitudinally extending hollow member, and longitudinally corrugated sheathing laid upon said carlines and secured thereto, said sheathing comprising narrow strips having upwardly extending edge flanges, the edge flanges of adjacent strips overlapping and cap strips telescoped over said overlapping edge flanges and secured thereto.

5. A roof sub-assembly for vehicle bodies comprising a truss structure including spaced carlines connected together in their ends by a continuous longitudinally extending channel telescoped over said ends and secured thereto through both side walls of the channel, gussets overlapping the ends of the carlines and the adjacent portions of the channel and secured thereto and extending downwardly beyond the ends of the carlines and the channel, a longitudinal extending molding strip of flanged channel section having its upper flange overlapping the gussets, the ends of the carlines and the side wall of the channel and secured thereto and its lower flange extended below the ends of the carlines and the bottom wall of the channel, whereby the bottom wall of said first named channel, the extended portions of the gussets and the extended flange of the molding strip channel are adapted to form final assembly joints with a side sub-assembly, said molding strip channel becoming a part of a longitudinally extending chord.

6. A vehicle body fabricated out of separate roof and side sub-assemblies, each of said sub-assemblies being a truss structure including spaced carlines and posts respectively, the carlines and posts of each of said sub-assemblies terminating in a common plane, a longitudinally extending channel member connecting the ends of the carlines and posts respectively of each sub-assembly and telescoped thereover and secured thereto through both side walls of the channel, a series of gussets overlapping the ends of the carlines and the side wall of the channel on one side of the roof sub-assembly and extended therebeyond to form final assembly joints with the side sub-assembly, a similar series of gussets overlapping the posts and the adjacent portions of the channel of the side sub-assembly on the side opposite the side to which said first named series of gussets are applied in final assembly, said second named series of gussets being extended beyond the channels connecting the posts of the side sub-assembly to overlap the roof sub-assembly and form final assembly joints therewith, the bottoms of the channels of the two sub-assemblies overlapping in the final assembly and being secured together in the final assembly joinder.

7. A vehicle body wall fabricated out of separate longitudinally extending sub-assemblies of substantially the length of the body, each of said sub-assemblies being a truss structure including longitudinally spaced frame members, said frame members of each of said sub-assemblies terminating in a common plane in the adjacent lateral margins of the respective sub-assemblies, a longitudinally extending channel member connecting the ends of the frame members of each sub-assembly and telescoped thereover and secured thereto through both side walls of the channel, the bottoms of the channels in the adjacent margins of the sub-assemblies being brought together in overlapping relation and joined together in the final assembly, and additional strength means independent of the usual sheathing or trim paneling and bridging the joint formed by the overlapping marginal channels on both sides of the joint and secured to the frame members and longitudinal connecting channels of both sub-assemblies, thereby reinforcing the joint.

8. A vehicle body wall fabricated out of separate longitudinally extending sub-assemblies of substantially the length of the body, each of said sub-assemblies being a truss structure including longitudinally spaced frame members, said frame members of each of said sub-assemblies terminating in the adjacent lateral margins of the sub-assemblies in a common plane, a longitudinally extending channel member connecting the ends of said frame members of each sub-assembly and telescoped thereover and secured thereto through both side walls of the channel, the bottoms of the channels and the adjacent margins of the sub-assemblies being brought together in overlapping relation and joined together in the final assembly, and longitudinal strength members independent of the usual sheathing or trim paneling, extending substantially the length of the body and bridging both sides of the joint formed by the overlapping marginal channels and secured to the frame members and edge channels of both sub-assemblies and thereby reinforcing the joint.

9. A vehicle body wall fabricated out of separate longitudinally extending sub-assemblies of substantially the length of the body, each of said sub-assemblies being a truss structure including longitudinally spaced frame members, said frame members of each of said sub-assemblies terminating in the adjacent lateral margins of the sub-assemblies in a common plane, a longitudinally extending channel member connecting the ends of said frame members of each sub-assembly and telescoped thereover and secured thereto through both side walls of the channel, the bottoms of the channels and the adjacent margins of the sub-assemblies being brought together in overlapping relation and joined together in the final assembly, and additional means including gussets and hollow longitudinal members extending the length of the joint, each of said gussets and members bridging the joint on both sides thereof and being secured to the frame members and longitudinal marginal channels of both sub-assemblies.

10. A final assembly joint between separately fabricated roof and side sub-assemblies for vehicle bodies, each of said sub-assemblies having longitudinally spaced frame members, terminating in a common plane and joined together by a channel member extending the length of the sub-assembly and telescoped over the ends of the longitudinally spaced frame members and secured thereto through both its side walls, the bottom walls of said channels in the final assembly overlapping and being secured together, gussets bridging the opposite side walls of said channels and overlapping adjacent ends of the longitudinally spaced frame members of said separate sub-assemblies and secured thereto in the overlapped area, and flanged channel molding strips extending the length of the sub-assemblies and bridging the joint formed by the overlapped bottom walls of the channels and secured through one of the flanges to the channels, gussets and ends of the longitudinally spaced frame members of one of said sub-assemblies, and through the other of their flanges overlapping similar elements of the other of said sub-assemblies and secured thereto.

11. A vehicle body having its walls fabricated of truss structures built up in large part of light hollow section members spot welded together, said structure including side walls having a door opening therein and a composite beam extending the length of the body above the door opening and comprising a pair of channels arranged with the bottom walls back to back and secured together, and a pair of flanged channel members each overlapping through its flanges the adjacent side walls of the first-named channels and secured thereto.

12. A roof sub-assembly for vehicle bodies comprising a truss structure including spaced carlines terminating at each side thereof in a common plane and connected together in said plane by a continuous member of angular cross section extending the length of the body and having a branch of its angular section overlapping the ends of the carlines and another branch overlapping the sides of the carlines and secured thereto through said overlap, sheathing integrally secured to said carlines, gussets independent of the sheathing and between the sheathing and carlines overlapping the ends of the carlines and the adjacent portions of the continuous member and secured thereto and extended downwardly therebeyond, whereby said extended portions of the gussets and the first named branch of said continuous member are adapted to form final assembly joints with a side sub-assembly, the continuous members at the end of the carlines becoming parts of the through-running top chord members of a complete truss.

13. A vehicle body wall fabricated out of separate longitudinally extending sub-assemblies of substantially the length of the body, each of said sub-assemblies being a truss structure including longitudinally spaced frame members, said frame members of each of said sub-assemblies terminating in a common plane in the lateral margins of the adjacent sub-assembly, a longitudinally extending member of angular cross section connecting the ends of the frame members of each sub-assembly and having one branch overlapping the ends of the frame members, another branch of said longitudinally extending member overlapping the sides of said frame members and secured thereto, the branches of the longitudinally extending members overlapping the ends of the frame members in the adjacent margins of the sub-assemblies being joined together in the final assembly, and a through-running longitudinal strength member independent of the usual sheathing or trim paneling and overlapping and secured in final assembly to the adjacent branches of said first-named longitudinally extending members to form therewith a through-running chord of a side wall truss.

14. In a vehicle body of the class described including a side wall structure, and a roof structure, said side wall structure being a sub-assembly unit including a top chord member, a lower chord member, and intermediate posts secured to said chord members, the combination of a longitudinally extending member adjacent and secured to the top chord member constituting a part of said side wall sub-assembly unit and overlapping the final assembly joint between the side wall structure and the roof structure, said longitudinally extending member being a final trim moulding of channel shaped cross section and being secured to said roof structure at final assembly and constituting a part of the joint structure between the side wall and the roof structure.

15. In a vehicle body of the class described including a side wall structure, and a roof structure, said side wall structure being a sub-assembly unit including a top chord member, a lower chord member, and intermediate posts secured to said chord members, the combination of a longitudinally extending member adjacent and secured to the top chord member constituting a part of said side wall sub-assembly unit and being a final trim moulding of channel shaped cross section secured in part to the inside of the side wall unit and in part extending above the top of the side wall unit and secured in final assembly to the adjacent roof structure and constituting a part of the joint structure between the side wall and roof structures.

16. A vehicle body of the class described including a sub-assembly side wall structure, said structure including angular shaped top chord members and lower chord members, intermediate posts extending between said chord members and secured thereto, and means adjacent the top chord member and extending above said top chord member to complete a joint with an adjacent roof structure, said means including a continuous longitudinal strength member independent of the usual sheathing or trim paneling and extending along the length of the joint between the roof structure and the side frame structure and being secured to both the roof and side frame structures on opposite sides of the joint and throughout the length of the joint, whereby the joint between the roof and side wall structures is materially reinforced.

17. A vehicle body of the class described including a sub-assembly side wall structure, said structure including angular shaped top chord members and lower chord members, intermediate posts extending between said chord members and secured thereto, and means adjacent the top chord member and extending above said top chord member to complete a joint with an adjacent roof structure, said means including a continuous longitudinal flanged channel shaped moulding member extending along the length of the joint between the roof structure and the side frame structure, and secured through its flanges to the side wall structure and to the roof structure.

18. A roof sub-assembly for a rail car body which comprises a plurality of spaced carlines, means to maintain the spacing of said carlines on opposite sides of the longitudinal center of the roof including longitudinally extending means adjacent the edges of the carlines and secured thereto, said longitudinally extending means forming a part of a final assembly joint with a side frame structure, said longitudinally extending means including a channel shaped moulding, a part of which is secured to the respective carlines and a part extended therebeyond for securement in final assembly to the side frame structure, said moulding materially reinforcing the joint between the roof and side wall structures.

19. A roof sub-assembly for a truss type rail car body which comprises a plurality of spaced carlines, means to maintain the spacing of said carlines on opposite sides of the longitudinal center of the roof including longitudinally extending means adjacent the edges of the carlines and secured thereto, said longitudinally extending means forming a part of a final assembly joint with a side frame structure, said longitudinally extending means including an angular cross section member secured to the sides and ends of the respective carlines and a continuous moulding of channel shaped cross section having a portion of its channel cross section extending longitudinally across the joint, said longitudinally extending means becoming a part of the top chord of the body truss.

20. A roof sub-assembly unit for a vehicle body which includes a plurality of longitudinally spaced transversely extending carlines, means to maintain the longitudinal spacing thereof including through running members tying together the ends of the carlines, a sheathing secured to said carlines and means secured to the respective carlines between the sheathing and carlines and extending beyond the ends of said carlines forming a downwardly and inwardly presenting joint structure for final assembly and attachment to an adjacent wall structure, and plate means secured to the respective carlines adjacent the edges thereof to assist in reenforcing portions of an adjacent side wall structure.

21. A final assembly joint between longitudinal wall structures of a rail car body, each of which have longitudinally spaced members, which includes a longitudinal member running the length of the joint and overlapping the joint and a plurality of spaced transverse members overlapping the joint on each side of the joint at the respective longitudinally spaced members.

22. A final assembly joint between roof and side units of a rail car body having complementary parts of the joint carried by the respective units, one of said complementary parts common to the adjacent units being an overlapping channel shaped final moulding strip.

23. A vehicle body having a sheathed roof member including transverse carlines, angular means attached to the carlines near the ends thereof, a side frame member having posts, angular means attached to the posts near the ends thereof, said angular means being brought into abutting position at assembly of the roof and side frame members, and transversely extending means including longitudinally extending strength members independent of the usual sheathing or trim paneling, one of said strength members initially secured to each of the body members, overlapping the joint between said body members and being joined to the other body member in final assembly, said transversely extending means being attached to bridge the joint between the side of the roof and side frame members both on the inside and on the outside, whereby they form with said angular means a strongly reinforced joint structure serving as a truss chord.

24. A final assembly joint between longitudinal trussed wall structures of a rail car body, each of which comprises a plurality of longitudinally spaced frame members, channel-shaped longitudinal members telescoped over the ends of said longitudinally spaced frame members, each of said longitudinal members being secured through the channel side walls thereof to the adjacent longitudinally spaced frame members, said channel-shaped members being mounted and secured to each other back to back, and a longitudinally extending strength member independent of the usual sheathing or trim paneling and bridging adjacent side walls of the channel-shaped members and secured thereto to form therewith a longitudinal chord structure of a truss.

25. A roof subassembly unit for a vehicle body which includes a plurality of longitudinally spaced transversely extending carlines, means to maintain the longitudinal spacing thereof including through-running channel members tying together the ends of the carlines and through-running strength affording members independent of the usual sheathing and secured to the outer sides of the respective carlines and said channel members and extending transversely of the joint beyond the ends of said carlines on the outside thereof and forming with said through-running channel members downwardly and inwardly presenting joint structures, each for final assembly to an adjacent wall structure, said strength members forming a material reinforcement for the joints between said roof and the adjacent wall structures.

26. A final assembly joint between a vehicle body side frame structure and a roof structure which includes a longitudinal marginal member on each of said structures running along the length of the joint, said members overlapping and being secured together and strength means, independent of the usual sheathing or trim panelling, extending transversely of the joint on one side of one of the structures and transversely of the joint beyond its associated longitudinal marginal member for final assembly with the other structure and further strength means, other than the usual sheathing or trim panelling, extending transversely of the joint on the other side of the other structure and transversely of the joint beyond its associated longitudinal member for final assembly with the first structure.

ALBERT G. DEAN.